US009862326B2

(12) United States Patent
Lem et al.

(10) Patent No.: US 9,862,326 B2
(45) Date of Patent: Jan. 9, 2018

(54) ARRANGEMENT FOR CARRYING OBJECTS, IN PARTICULAR MEDICATIONS OR MEDICAL ARTICLES, IN A VEHICLE

(71) Applicant: FORD GLOBAL TECHNOLOGIES, LLC, Dearborn, MI (US)

(72) Inventors: Jeroen Lem, Maastricht (NL); Karl Michael Siebertz, Aldenhoven (DE); Rainer Vogt, Aachen (DE); Marcel Mathissen, Würselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/971,540

(22) Filed: Dec. 16, 2015

(65) Prior Publication Data
US 2016/0193966 A1 Jul. 7, 2016

(30) Foreign Application Priority Data

Jan. 6, 2015 (DE) .................. 10 2015 200 043

(51) Int. Cl.
*B60R 7/06* (2006.01)
*B60H 1/00* (2006.01)

(52) U.S. Cl.
CPC .......... *B60R 7/06* (2013.01); *B60H 1/00271* (2013.01); *B60H 2001/003* (2013.01)

(58) Field of Classification Search
CPC  B60H 1/00271; B60H 2001/003; B60R 7/06; B60R 7/02
USPC .......................................... 340/540; 206/438
See application file for complete search history.

(56) References Cited

U.S. PATENT DOCUMENTS

| 8,061,149 B1* | 11/2011 | Gowans ................. A61J 1/165 62/3.62 |
| 8,544,286 B2* | 10/2013 | Janssen .................. A61J 1/165 62/130 |
| 8,948,935 B1* | 2/2015 | Peeters ................. B64C 39/024 701/3 |
| 2006/0291533 A1* | 12/2006 | Faries, Jr. ............. A61J 1/1475 374/162 |
| 2009/0218849 A1* | 9/2009 | Rupar ................ B60H 1/00271 296/182.1 |

(Continued)

FOREIGN PATENT DOCUMENTS

| DE | 19811185 C1 | 7/1999 |
| DE | 20002717 U1 * | 6/2000 |

(Continued)

OTHER PUBLICATIONS

English machine translation of 102004043756A1.

(Continued)

*Primary Examiner* — Hirdepal Singh
(74) *Attorney, Agent, or Firm* — Vichit Chea; King & Schickli, PLLC

(57) ABSTRACT

The invention relates to an arrangement for carrying objects, in particular medications or medical articles, in a vehicle. The arrangement includes a storage compartment for accommodating the objects to be carried and a regulating unit for regulating at least one parameter characteristic of the climatic conditions present in the storage compartment. The regulating unit is designed to carry out the regulation in dependence on the presence of one or more objects in the storage compartment.

14 Claims, 3 Drawing Sheets

(56) References Cited

U.S. PATENT DOCUMENTS

2011/0140830 A1* 6/2011 Lane .................. G05B 23/0272
340/3.1
2012/0137706 A1* 6/2012 Hussain ........... G06K 19/07749
62/3.6
2012/0176245 A1* 7/2012 Paydar ................... G01K 3/005
340/585

FOREIGN PATENT DOCUMENTS

DE 102004043756 A1 3/2006
DE 102007009741 A1 10/2007

OTHER PUBLICATIONS

English machine translation of DD102007009741A1.
English machine translation of DE20002717U1.
English machine translation of DE19811185C1.

\* cited by examiner

ARRANGEMENT FOR CARRYING OBJECTS, IN PARTICULAR MEDICATIONS OR MEDICAL ARTICLES, IN A VEHICLE

TECHNICAL FIELD

The invention relates to an arrangement for carrying objects, in particular medications or medical articles, in a vehicle.

BACKGROUND

A variety of illnesses require treatment with regular ingestion of medications. Thus, for example, persons who suffer from diabetes have to inject insulin at regular time intervals and also monitor their blood sugar level. Such persons are therefore forced to carry their medicine and any required equipment at all times, since otherwise hazardous or even life-threatening situations can occur.

Nonetheless, the case frequently occurs that persons forget the medications or equipment that they are to carry and only notice this when they have already left their residence. In such cases, an automatic warning device in the motor vehicle is desirable, which reminds the affected person that the required medications or equipment are not located in the vehicle.

A device and a method, inter alia, for the complete detection of objects in a vehicle are known from DE 10 2004 043 756 A1, wherein at least one marking associated with an object is detected and a marking signal corresponding to the marking is generated. After analysis of the marking signal, a comparison to at least one data set and the generation of a difference signal representing the comparison result are performed. In dependence on this difference signal, a warning signal is possibly generated, to indicate if necessary to the driver that he has forgotten objects to be carried.

Inter alia, a monitoring method for the presence and/or absence of objects, in particular in an interior of a vehicle, is known from DE 10 2007 009 741 A1, wherein in the event of presence or absence of detected objects, a message is possibly output on a display screen or in the form of an acoustic or visual alarm, wherein RFID tags on the respective objects to be checked are possibly also detected.

A further circumstance to be considered in practice, however, is that special storage conditions generally apply for medicines, which have to be maintained to ensure the effectiveness and reliability of these medicines. In this context, it is expressly noted, for example, by the German Federal Ministry of Health, that medicines should not be stored in a vehicle, since high interior temperatures are reached therein in summer, for example.

SUMMARY

It is an object of the present invention to provide an arrangement for carrying objects, in particular medications or medical articles, in a vehicle, which enables more reliable availability of the objects in the proper state.

This object is achieved by the arrangement described in this document.

An arrangement for carrying objects, in particular medications or medical articles, in a vehicle comprises:

a storage compartment for accommodating the objects to be carried; and a regulating unit for regulating at least one parameter characteristic of the climatic conditions present in the storage compartment;

wherein this regulating unit is designed to carry out the regulation in dependence on the presence of one or more objects in the storage compartment.

The concept includes, in particular, the implementation of a special storage compartment inside the vehicle, which is optimized for storing medicines. The storage compartment has a climate control, to ensure (in particular with heating or cooling), the respective proper, correct storage conditions for the objects to be carried. For this purpose, in particular temperature and/or moisture sensors can be provided at the suitable positions of the storage compartment. Since the dimensions of the storage compartment can be comparatively small and in addition the storage compartment can be insulated with respect to climate, a high efficiency can be achieved with this climate control.

According to the invention, in particular monitoring or checking can be performed as to whether objects or products or medications are present in the storage compartment. For example, a simple photoelectric relay or a light barrier can be used for this purpose. In this way, situations in which no medicines are located in the storage compartment can be used for saving energy, since no climate control is then necessary.

The parameter(s) characteristic for the climatic conditions present in the storage compartment can be in particular the ambient humidity and/or the temperature.

According to one embodiment, the arrangement is furthermore designed to generate a warning signal in dependence on the presence of one or more objects in the storage compartment. The relevant warning signals can occur, for example, as tone signals, light signals, vibration of the key fob, transmission of an SMS, or in another suitable manner.

Furthermore, a warning signal can also be generated if specific medications or equipment are left behind in the vehicle, after it has been locked.

According to one embodiment, the arrangement is furthermore designed to generate a start release to enable an engine start in dependence on the presence of one or more objects in the storage compartment. In particular, instead of an automatic warning, an automatic query (for example, "Are all medications in the vehicle?") can also occur upon starting the vehicle, wherein the vehicle is only started, for example, when an "OK" button is actuated in reaction to this query.

According to one embodiment, the arrangement furthermore comprises a detection unit for detecting at least one item of information characterizing an object present in the storage compartment.

According to one embodiment, this detection unit comprises an RFID read unit. The invention can thus be implemented particularly advantageously in conjunction with medications or medicines, which are equipped with an RFID chip. Because of the variety of data which are storable on such an RFID chip, if an integrated RFID read device is present in the storage compartment, the possibility is provided of checking what precisely is present in the storage compartment or vehicle, wherein if medications are forgotten, a warning can occur via an audio or SYNC system present in the vehicle or another communication channel.

The data stored in an RFID chip can also be used for automatically setting a suitable temperature window in the storage compartment, for example, a temperature in the range from 2° C. to 8° C. or a temperature in the range from 15° C. to 25° C.

According to one embodiment, the at least one item of information characterizing an object present in the storage compartment relates to the storage life of this object. In some applications, persons, who require specific medications or equipment urgently from time to time, store, for example, an "emergency kit" for longer periods of time in the vehicle. The case can occur here that at a point in time at which this kit is required, the storage life date has already expired. The invention can be used in this case for the purpose of transmitting a corresponding signal to the driver if the expiration date is known.

According to one embodiment, the at least one item of information characterizing an object present in the storage compartment relates to climatic conditions which are prescribed or recommended for the storage of this object.

According to one embodiment, the arrangement is furthermore designed to generate a warning signal if the climatic conditions which are prescribed or recommended for the storage of this object are not ensured because of an inadequate power supply or as a result of excessively high external temperatures. In some embodiments, in particular for the case in which maintaining a desired temperature window was or is not possible for a specific duration, a warning can be given to the driver. A request can possibly also be given to the driver to remove the medicine from the vehicle.

According to one embodiment, the storage compartment is designed as a portable container which is removable from the vehicle. In embodiments of the invention, the storage compartment can be designed modularly as a portable box which is removable from the vehicle, and which can be equipped with a suitable connection device (for example, according to the "plug-and-play" principle). Such an embodiment is advantageous in situations in which, on the one hand, there is a high power consumption, but, on the other hand, the vehicle is out of operation for a long time. In this case, separate channels can be used in each case for the mechanical attachment, the voltage or power supply, and the data transfer when the box is connected to the vehicle.

When the vehicle is turned off, for the case in which medicines are left behind in the vehicle, an emergency power supply can possibly be used. Furthermore, an external voltage or current source can also be used, to which, for example, a parked electric vehicle is connected.

Further embodiments of the invention can be inferred from the description and the dependent claims.

The invention will be explained in greater detail hereafter on the basis of an exemplary embodiment, which is illustrated in the appended figures.

BRIEF DESCRIPTION OF THE DRAWING FIGURES

DETAILED DESCRIPTION

Figure 1:
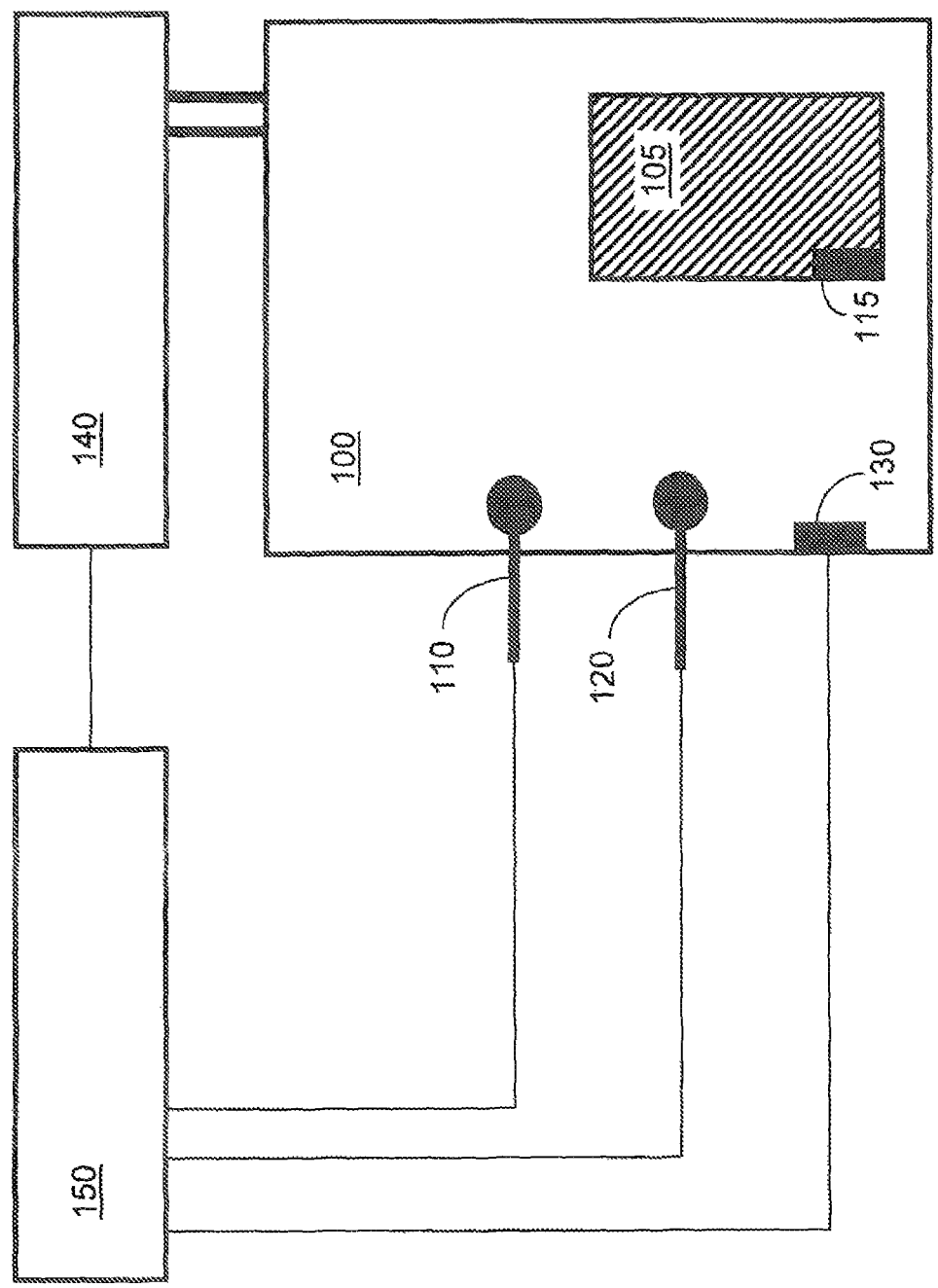
FIG. 1 shows a block diagram to explain components present in an arrangement.

Firstly, individual components of the current device and the function thereof are explained hereafter with reference to the block diagram shown in FIG. 1.

According to the schematic illustration of FIG. 1, a medication 105, which is provided with an RFID tag 115, is located in a storage compartment 100. Furthermore, a temperature sensor 110 and a moisture sensor 120 are arranged in the storage compartment 100 according to FIG. 1, wherein the temperature and moisture values detected by these sensors are transmitted as sensor signals to a central regulating unit 150. Furthermore, an RFID read unit 130 is provided in or on the storage compartment 100 to detect the RFID tag 115 or to read the information stored therein, wherein the data detected by this RFID read unit 130 are also transmitted to the central regulating unit 150.

The central regulating unit 150 regulates, on the basis of the signals of the temperature sensor 110, the moisture sensor 120, and the RFID read unit 130, the operation of a climate control 140, by means of which the climate existing in the storage compartment 100 is regulated to a desired target climate in dependence on the medication(s) 105 located therein and/or the data stored in the RFID tag 115.

Figure 2:
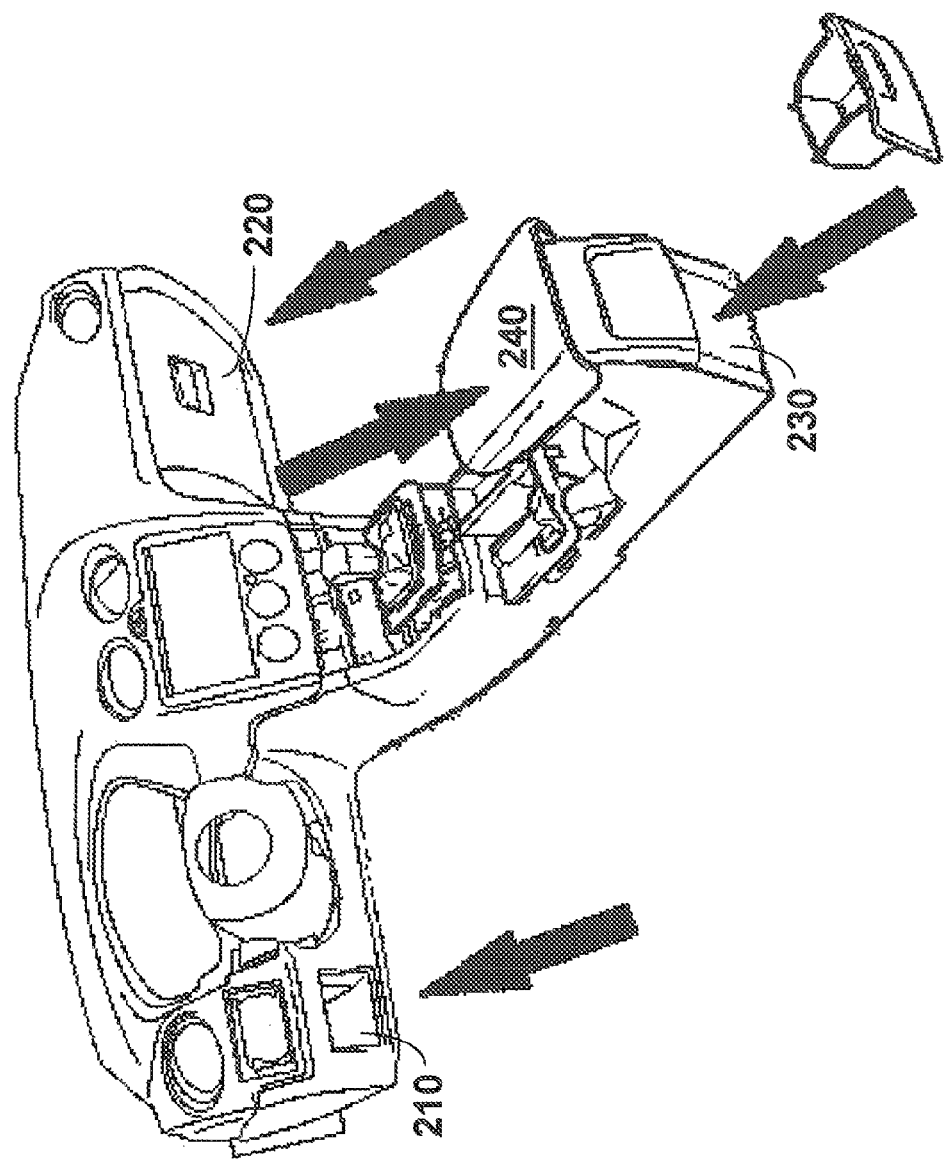
FIG. 2 shows a perspective view, which is solely schematic, to explain possible storage positions of an arrangement.

Exemplary storage positions of the storage compartment 100 or the components associated with the device are shown solely as examples in the perspective view of FIG. 2. According to FIG. 2, a corresponding storage compartment can be implemented, for example, as a drawer compartment in a region 210 below the steering wheel, in a region 220 at the location of the glove compartment, in a region 230 of the central console, or also in a region of the middle armrest 240.

Figure 3:
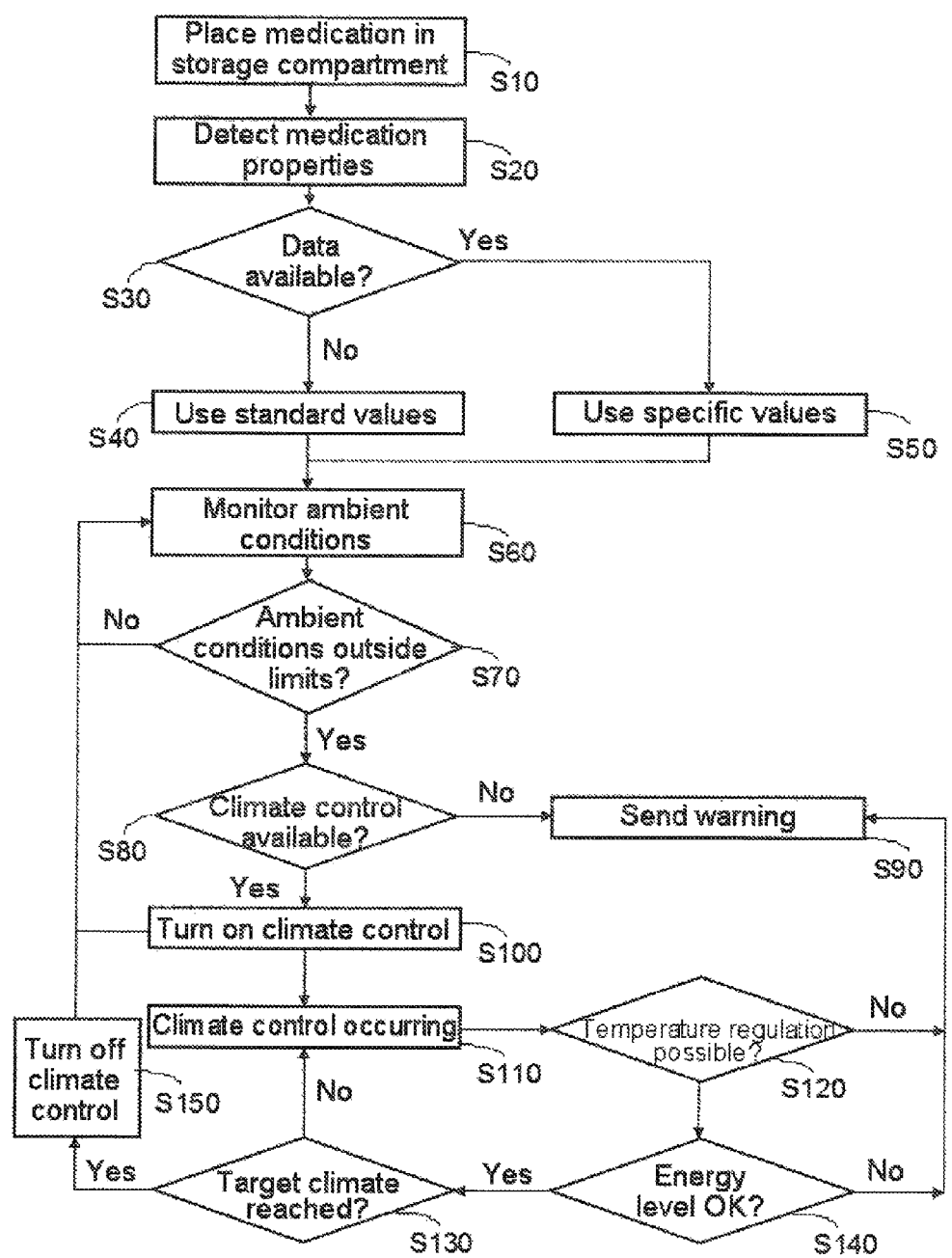
FIG. 3 shows a flow chart to explain an exemplary usage of the arrangement in one embodiment.

A possible usage or functionality of the arrangement in one embodiment is described hereafter with reference to the flow chart shown in FIG. 3.

According to FIG. 3, firstly a medication is placed in the storage compartment 100 according to a step S10. The automatic detection of the medication properties is performed in subsequent step S20.

Subsequently, the query as to whether specific data or values relating to the respective medication are available is performed in step S30. If this is not the case, standard values are used (step S40). If specific data or values are available, they are used hereafter (step S50).

The monitoring of the ambient conditions is subsequently performed in step S60. If these ambient conditions lie outside predefined limiting values according to the query in subsequent step S70, the query as to whether the climate control is available is performed in a further step S80. If this is the case, the climate control is turned on in step S100. If availability of the climate control is not provided, the emission of a warning signal is performed in step S90. A corresponding warning signal is also emitted in step S90 if it is established with occurring climate control (step S110) in a query in step S120 that a temperature regulation is not possible.

However, if the temperature regulation is possible according to the query in step S120, the query is performed in a further step S140 as to whether the energy level is sufficient. If the latter is not the case, the emission of a warning signal (step S90) also occurs. In the case of a sufficient energy level established in step S140, the query occurs as to whether the desired "target climate" is reached in step S130. As soon as this is the case, the climate control is turned off (step S150) and a return to step S60 occurs with further monitoring of the ambient conditions. As long as the target climate is not yet reached according to the query in step S130, the climate control is still carried out according to step S110.

What is claimed:

1. An arrangement for carrying objects, in particular medications or medical articles, in a vehicle, wherein the arrangement comprises:

a storage compartment for accommodating the objects to be carried; and a regulating unit for regulating at least one parameter characteristic of the climatic conditions present in the storage compartment;

wherein (a) said regulating unit is designed to carry out the regulation in dependence on the presence of one or more objects in the storage compartment, (b) said at least one parameter characteristic of climatic conditions present in the storage compartment are ambient humidity and temperature, (c) said arrangement is furthermore designed to generate a warning signal in dependence on the presence of one or more objects in the storage compartment and (d) said arrangement is furthermore designed to generate a start release to enable an engine start in dependence on the presence of one or more objects in the storage compartment.

2. The arrangement as claimed in claim 1, wherein said arrangement furthermore comprises a detection unit for detecting at least one item of information characterizing an object present in the storage compartment.

3. The arrangement as claimed in claim 2, wherein said detection unit comprises an RFID read unit.

4. The arrangement as claimed in claim 3, wherein the at least one item of information characterizing an object present in the storage compartment relates to the storage life of this object.

5. The arrangement as claimed in claim 4, wherein the at least one item of information characterizing an object present in the storage compartment relates to climatic conditions which are prescribed or recommended for the storage of this object.

6. The arrangement as claimed in claim 5, wherein said arrangement is furthermore designed to generate a warning signal if the climatic conditions which are prescribed or recommended for the storage of this object are not ensured because of an inadequate energy supply or as a result of excessively high external temperatures.

7. The arrangement as claimed in claim 6, wherein the storage compartment is designed as a portable container which is removable from the vehicle.

8. An arrangement for carrying objects, in particular medications or medical articles, in a vehicle, wherein the arrangement comprises:

a storage compartment for accommodating the objects to be carried; and a regulating unit for regulating at least one parameter characteristic of the climatic conditions present in the storage compartment;

wherein the regulating unit is designed to carry out the regulation in dependence on the presence of one or more objects in the storage compartment, and wherein said arrangement is designed to generate a start release to enable an engine start in dependence on the presence of one or more objects in the storage compartment.

9. The arrangement as claimed in claim 8, wherein said arrangement furthermore comprises a detection unit for detecting at least one item of information characterizing an object present in the storage compartment.

10. The arrangement as claimed in claim 9, wherein said detection unit comprises an RFID read unit.

11. The arrangement as claimed in claim 9, wherein the at least one item of information characterizing an object present in the storage compartment relates to the storage life of this object.

12. The arrangement as claimed in claim 9, wherein the at least one item of information characterizing an object present in the storage compartment relates to climatic conditions which are prescribed or recommended for the storage of this object.

13. The arrangement as claimed in claim 9, wherein said arrangement is furthermore designed to generate a warning signal if the climatic conditions which are prescribed or recommended for the storage of this object are not ensured because of an inadequate energy supply or as a result of excessively high external temperatures.

14. The arrangement as claimed in claim 8, wherein the storage compartment is designed as a portable container which is removable from the vehicle.

* * * * *